United States Patent
Glacki et al.

(12)

(10) Patent No.: US 12,441,531 B2
(45) Date of Patent: Oct. 14, 2025

(54) METHOD FOR PACKING AND UNPACKING FLAT SUBSTRATES

(71) Applicant: SCHOTT AG, Mainz (DE)

(72) Inventors: Alexander Glacki, Hannover (DE); Andreas Brunotte, Grünenplan (DE); Rainer Buchhorn, Eschershausen (DE); Ernst-Friedrich Düsing, Alfeld (DE); Lutz Gäckle, Göttingen (DE); Michael Kania, Duingen (DE); Klaus-Peter Kurek, Mainz (DE); Michael Maedje, Grünenplan (DE); Anke Weems, Grünenplan (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 18/316,284

(22) Filed: May 12, 2023

(65) Prior Publication Data

US 2023/0303303 A1    Sep. 28, 2023

Related U.S. Application Data

(63) Continuation of application No. PCT/EP2021/080590, filed on Nov. 4, 2021.

(30) Foreign Application Priority Data

Nov. 17, 2020  (DE) ............... 10 2020 130 292.4

(51) Int. Cl.
  *B65D 81/05*   (2006.01)
  *B65D 85/48*   (2006.01)
(52) U.S. Cl.
  CPC ............ *B65D 81/05* (2013.01); *B65D 85/48* (2013.01)

(58) Field of Classification Search
  CPC .................. B65D 81/05; B65D 85/48
  (Continued)

(56) References Cited

U.S. PATENT DOCUMENTS 5,972,473 A * 10/1999 Arakawa ............... B65D 65/38
                                                28/220
6,286,684 B1 * 9/2001 Brooks ............. H01L 21/67369
                                                206/523

(Continued)

FOREIGN PATENT DOCUMENTS

DE    102004061021    6/2006
JP    2006327641 A    12/2006
(Continued)

OTHER PUBLICATIONS

ISO 8791-4, "Paper and board—Determination of roughness/smoothness (air leak methods)—Part 4: Print-surf method", Third Edition, May 2021, 24 pages.

(Continued)

*Primary Examiner* — Steven A. Reynolds
(74) *Attorney, Agent, or Firm* — Ruggiero McAllister & McMahon LLC (57) ABSTRACT

A method for packing flat substrates, more particularly glass substrates, in a packaging box is provided. The method include the steps of: providing a base part of the packaging box, the base part comprising a lower wall and preferably four side walls, placing a flat substrate directly or indirectly on the lower wall of the base part of the packaging box, placing an intermediate layer directly or indirectly on the placed flat substrate, forming a stack of flat substrates and intermediate layers therebetween by repeating the preceding two steps, and setting a cover part of the packaging box on the base part of the packaging box.

20 Claims, 3 Drawing Sheets

(58) Field of Classification Search
USPC .................................... 206/449, 453, 454
See application file for complete search history.

(56) References Cited

U.S. PATENT DOCUMENTS

| | | | | |
|---|---|---|---|---|
| 8,701,886 | B2* | 4/2014 | Chen | B29C 43/18 |
| | | | | 378/187 |
| 8,863,956 | B2* | 10/2014 | Brooks | H01L 21/67396 |
| | | | | 206/454 |
| 9,321,574 | B2* | 4/2016 | Garner | B65B 61/22 |
| 2002/0004179 | A1 | 1/2002 | Nishiyama | |
| 2002/0170842 | A1* | 11/2002 | Usui | G03C 3/00 |
| | | | | 206/449 |
| 2004/0074798 | A1* | 4/2004 | Taylor | B65D 77/042 |
| | | | | 206/583 |
| 2004/0195142 | A1* | 10/2004 | Hayashi | B65D 57/006 |
| | | | | 206/545 |
| 2005/0098473 | A1* | 5/2005 | Sheehan | H01L 21/67369 |
| | | | | 206/832 |
| 2005/0109651 | A1* | 5/2005 | Fujimori | B65D 81/03 |
| | | | | 206/524.7 |
| 2006/0144392 | A1 | 7/2006 | Blau | |
| 2007/0095703 | A1* | 5/2007 | Kao | B65D 85/48 |
| | | | | 206/454 |
| 2008/0128310 | A1* | 6/2008 | Kao | B65D 81/107 |
| | | | | 206/521 |
| 2013/0299376 | A1* | 11/2013 | Chen | B65D 85/48 |
| | | | | 206/454 |
| 2022/0340352 | A1* | 10/2022 | Hosoya | B65D 81/113 |

FOREIGN PATENT DOCUMENTS

| | | |
|---|---|---|
| JP | 2009269610 A | 11/2009 |
| JP | 2011255911 A | 12/2011 |

OTHER PUBLICATIONS

ISO 8791-2, "Paper and board—Determination of roughness/smoothness (air leak methods)—Part 2: Bendtsen method", Second Edition, Sep. 15, 2013, 24 pages.
DIN EN 1924-2, Paper and cardboard—Determination of properties under tensile stress—Prt 2: Constant strain rate method (20 mm/min), May 2009, p. 22.
DIN EN ISO 2758, "Paper—Determination of burst strength", Dec. 2014, 21 pages.
DIN EN 20 535, "Paper and cardboard—Determination of water absorption capacity—Cobb method", Jun. 2023, 20 pages.
DIN EN 20 287, "Paper and cardboard—Determination of moisture content of a supply item—Heating cabinet method", Mar. 2018, 16 Pages.

* cited by examiner

Fig. 5

METHOD FOR PACKING AND UNPACKING FLAT SUBSTRATES

CROSS REFERENCE TO RELATED APPLICATIONS

This application is a continuation of International Application PCT/EP2021/080590 filed Nov. 4, 2021, which claims benefit under 35 USC § 119 of German Application 10 2020 130 292.4 filed Nov. 17, 2020, the entire contents of all of which are incorporated herein by reference.

BACKGROUND

1. Field of the Invention

The invention relates to a method for packing flat substrates, more particularly glass substrates, in a packaging box, to a packaging with flat substrates packed therein, and to a method for unpacking packed flat substrates from a packaging box.

2. Description of Related Art

A variety of methods have been disclosed for the packing of glass substrates. In the event of a plurality of identical or similar substrates being packed, they may in particular be stacked on one another and spaced from one another with interlayers, in order to avoid direct contact of the glass surfaces.

The known methods, however, are still in need of improvement, particularly with regard to the packaging of flat glass, thin glass, very thin glass and ultra-thin glass (UTG), with thicknesses of under 100 µm, for example. Problems during packing, transport and/or unpacking in these contexts come about for reasons including the lack of inherent stiffness of the substrates. Frequently there is a high risk of breakage, especially during transport, with the susceptibility to breakage being particularly high in the case of thin glasses, as in the case of UTG, for example. In the case of UTG, in particular, protection of the edge and protection from shearing stresses are particularly important in order to avoid breakage, both during transport and during loading and unloading of a transport pack. Solutions which provide for lamination to protect the glass, such as TFT cover glass (with thicknesses of over 0.3 mm, for example), are costly and inconvenient and in the case of thin glasses are often not applicable. In the case of lamination of UTG with film, for example, detachment of the film may result in the breakage of untreated, raw UTG glass. Methods which provide for lamination by the sprayed application of a size or the like are likewise unfavorable, as this necessitates additional washing operations. Interlayers used also sometimes give rise to problems. For example, the glass surfaces may be susceptible to surface reaction, and reaction of the glass, for example, with interlayer material may result in formation of unwanted surface defects, examples being haze, salt deposits, glass corrosion, etc. In addition, packaging produced by known methods is often unsuitable for automated unpacking.

SUMMARY

The object on which the invention is based, accordingly, is that of providing a method for packing flat substrates, more particularly thin glass substrates (e.g., UTG), which ensures high protection, especially of the glass edge, in order to reduce the susceptibility to breakage. One aspect of the object of the invention, accordingly, is that the packaging produced in accordance with the method ensures secure and loss-free transport of the substrates without breakages or scratches. A further aspect of the object of the invention is to ensure maximum cleanness of the substrates after unpacking, and especially to prevent surface reaction and/or particle formation in the packaging or during transport. A further aspect of the object of the invention is to specify a method and packaging that enable automatic and/or convenient withdrawal of the substrates during unpacking.

To achieve the object, the invention provides the following method for packing flat substrates, more particularly glass substrates, in packaging box.

The method comprises providing a base part of the packaging box, where the base part comprises a lower wall and preferably one or more, more particularly four, lateral walls.

The method further comprises placing a flat substrate directly or indirectly onto the lower wall of the base part of the packaging box. The flat substrate therefore bears on the lower wall of the base part, where it either lies directly, i.e., unmediatedly, on the lower wall or else lies indirectly on the lower wall, with one or more further elements lying between the lower wall and the flat substrate. The flat substrate is preferably placed directly or indirectly in such a way that there remains a lateral spacing between the flat substrate and each of the lateral walls.

The method further comprises placing an interlayer directly or indirectly onto the emplaced flat substrate, preferably in such a way that the interlayer protrudes laterally beyond the flat substrate and protrudes into the lateral spacing. The interlayer here may protrude for example on at least one side, on two sides, more particularly two opposite sides, or else on three or four sides beyond the flat substrate and into the lateral spacing. The protruding parts of the interlayer may serve to protect the substrate edges and/or may serve for holding down during withdrawal of the substrates, in order to prevent the interlayer sticking on the substrate being withdrawn. Furthermore, the parts of the interlayer that protrude into the lateral spacing may be folded downward, to reduce or prevent slipping of the substrates. The projection of the interlayer relative to the flat substrate preferably has a defined value. The projection preferably runs all round.

The method further comprises forming a stack with flat substrates and interlayers therebetween by repeating—preferably alternately—the placing of flat substrates and the placing of interlayers. A stack preferably comprises more than 10, more preferably more than 50, more preferably still more than 75 flat substrates.

The method further comprises fitting a cover part of the packaging box onto the base part of the packaging box, in such a way that the stack of flat substrates formed is packed by the base part and the cover part from below and from above and preferably laterally. For this, the cover part preferably comprises an upper wall and preferably further comprises one or more, more particularly four, lateral walls. The cover part and/or the base part may have been folded from a plate. The method accordingly may also comprise the folding of a plate to form a cover part and/or the folding of a plate to form a base part.

In one development of the invention, the method comprises inserting one or more centering aids (guiding blocks), preferably four centering aids, each bordering one of the lateral walls, where the centering aids are used in particular before the placing of the flat substrate and before the forming of the stack.

The centering aid or the centering aids are disposed in the lateral spacing which remains between the flat substrate and each of the lateral walls. More particularly the centering aids are disposed in such a way that they at least partly bridge the lateral spacing. The centering aids may serve to maintain the lateral spacing during the forming of the stack. At least one centering aid may be provided in each case, for example, on at least one side, on two sides, more particularly two opposite sides, or else on three or, more preferably, four sides.

The centering aid or the centering aids are preferably shorter than the respective lateral wall, in such a way that the lateral spacing is partially bridging and partially free along the length of the lateral wall, and more particularly is free in the corners at adjacent lateral walls. The length of the centering aid may be, for example, less than 80 percent, less than 70 percent or else less than 60 percent of the length of the lateral wall.

The centering aid preferably comprises a hollow section plate and/or rubber, e.g., ethylene-propylene-diene rubber. The centering aid may also comprise two or more hollow section plates, where, for example, a hollow section plate facing the stack comprises rubber, e.g., ethylene-propylene-diene rubber, and/or a hollow section plate facing the lateral wall comprises plastic, e.g., polypropylene.

In one preferred method variant, the centering aids are removed again before the fitting of the cover part of the packaging box. It is, however, also possible in principle for the centering aids to remain in the packaging.

The method for packing flat substrates preferably further comprises placing an underlayer directly or indirectly onto the lower wall of the base part of the packaging box before the placing of the flat substrate directly or indirectly onto the underlayer and indirectly onto the lower wall of the base part. The underlayer is preferably embodied as a stiff base plate and/or may preferably have a greater stiffness than the lower wall of the packaging box.

The underlayer preferably protrudes laterally beyond the flat substrate placed thereon and protrudes into the lateral spacing. More preferably the underlayer borders up to one, two or more or all of the lateral walls of the base part of the packaging box.

The underlayer may, moreover, have one or more recesses, disposed for example at lateral margins, and able to be embodied to accommodate the centering aids. The recesses may have been generated, for example, by punching.

The underlayer preferably comprises a hollow section plate or is embodied as such and/or preferably comprises rubber, as for example ethylene-propylene-diene rubber.

The underlayer preferably has a different color from the packaging box and/or from the interlayers. More particularly the underlayer may have a darker color, having a black embodiment, for example. The underlayer, furthermore, may also have a pattern. In this way it is possible to enable or facilitate camera-assisted automated unpacking, as will be set out in more detail later on below. In particular a different color or a pattern can be recognized unambiguously by a camera system.

If no underlayer is provided or if the underlayer is formed by the lower wall of the base part, or else independently thereof, it is also possible, for example, for the lower wall of the base part to have a different color from the interlayers, more particularly a darker color, black for example, or a pattern.

It is possible for an interlayer first to be placed directly or indirectly onto the underlayer before the placing of the (first) flat substrate.

The method for packing flat substrates preferably further comprises placing an overlayer directly or indirectly onto the stack of flat substrates and interlayers therebetween that is formed, before the cover part of the packaging box is fitted. The overlayer may have an embodiment identical with that of the underlayer, so that fewer different components are employed.

The overlayer may in particular protrude laterally beyond the flat substrate and protrude into the lateral spacing. With particular preference the overlayer borders up to one, two or more or all of the lateral walls of the base part and/or of the cover part.

The overlayer may also have one or more recesses for the centering aids, which are punched or disposed on lateral margins, for example.

The overlayer may further comprise a hollow section plate or be embodied as such and/or comprise rubber, e.g., ethylene-propylene-diene rubber.

The method for packing flat substrates may further comprise placing a foam element, wherein the foam element is placed directly or indirectly onto the stack, and more particularly is placed directly or indirectly onto the overlayer, before the cover part of the packaging box is fitted. The foam element serves to compress the stack, so that it or the substrates and/or interlayers stacked therein does not or do not slip. Generally it is also possible for an elastic element of a different kind, rather than a foam element, to be provided, if the foam element would result in contamination in the packaging box and/or outgassing of plasticizers and if such effects are to be avoided.

The foam element may have a recess, more particularly two opposite recesses, which serve for the disposition/fastening of desiccant pouches. For example the foam element may have an H-shaped embodiment. The H shape may also, for example, comprise lugs so that the desiccant pouches cannot slip.

The foam element placed on the stack projects in particular beyond the lateral walls of the base part, preferably by at least 2 millimeters, more preferably at least 4 millimeters, more preferably still at least 6 millimeters or at least 8 millimeters, e.g., 10 millimeters. The projection of the foam element is preferably embodied such that the packaging box does not bulge and the stack does not slip. The method may comprise measuring the projection of the foam element and where appropriate inserting a (further) overlayer in order to increase the projection if the measured projection falls below a predefined value.

Before an overlayer and/or a foam element is placed on, a (further) interlayer may be placed directly or indirectly onto the stack.

The underlayer and/or the overlayer may contribute to ensuring sufficient stiffness of the packaging, especially for relatively large glass formats. If no underlayer and/or overlayer are employed, but also independently thereof, the base part and/or the cover part may ensure the requisite stiffness.

The interlayers which may be located between the flat substrates and/or else, for example, at the start or end of the stack preferably have one or more recesses for the centering aids, which may have been punched, for example.

In one preferred method variant an interlayer or interlayers are employed which have two opposite surfaces having different surface roughness, and each bordering, for example, a flat substrate. With particular preference here there is a lower surface having higher surface roughness and an upper surface having lower surface roughness. In this way, advantageously, the sticking of a flat substrate lying under an interlayer can be reduced when an interlayer is being withdrawn, and this may be advantageous in the case of thin glasses in particular.

The roughness of the interlayer surfaces may have values in accordance with ISO 8791/4 as follows: roughness of the lower side between 4 and 14 micrometers, preferably between 6 and 12 micrometers, more preferably between 8 and 10 micrometers. Roughness of the lower surface between 4 and 14 micrometers, preferably between 6 and 12 micrometers, more preferably between 8 and 10 micrometers. Roughness of the upper surface between 1 and 7 micrometers, preferably between 2 and 6 micrometers, more preferably between 3 and 5 micrometers.

Furthermore, the interlayer may have a pH which is between 5 and 9, preferably between 6 and 8, more preferably between 7 and 8, and the pH may be determinable in particular according to ISO 8791-2. The interlayer comprises preferably paper or consists of paper, in which case the basis weight provided may be between 20 to 80 $g/m^2$, preferably between 30 and 70 $g/m^2$, more preferably between 40 and 60 $g/m^2$, e.g., 50 $g/m^2$.

The interlayer may have a greater thickness than the flat substrate, preferably at least 1.25 times the thickness of the flat substrate, more preferably at least 1.5 times the thickness of the flat substrate. The thickness of the interlayer may be for example between 40 and 100 micrometers, preferably between 50 and 90 micrometers, more preferably between 60 and 70 micrometers.

The interlayer may additionally have one or more of the following properties according to DIN EN 1924-2: breaking force in machine direction (MD) between 20 and 80 N/15 mm, preferably between 30 and 50 N/15 mm. Breaking force in cross direction (CD) between 10 and 40 N/15 mm, preferably between 15 and 25 N/15 mm. Elongation in machine direction (MD) between 1.5% and 1.9%, preferably between 1.6% and 1.8%. Elongation in cross direction (CD) between 1.6% and 2.0%, preferably between 1.7% and 1.9%.

The interlayer may, moreover, have a bursting pressure according to DIN EN ISO 2758 of between 90 and 130 kPa, preferably between 100 and 120 kPa, and/or a Cobb value (water) according to DIN EN 20 535 of between 10 and 40 $g/m^2$, preferably between 15 and 32 $g/m^2$, and/or an absolute moisture content according to DIN EN 20 287 of between 1% and 5%, preferably between 2% and 4%. The interlayer in particular has a moisture content of under 20% (T=35°) and before being placed may be kept in a drying cabinet.

The chemistry of the interlayer (e.g., paper) is preferably adapted to the flat substrate (e.g., pH), in particular for the purpose of preventing glass corrosion, imprinting and/or haze. With the interlayer paper it is possible in particular to prevent the formation of haze (glass corrosion, reaction with acids, $H_2O+CO_2$ may react with Na on a glass surface to form $Na_2CO_3$ and may lead to a salt layer on the surface). The interlayer is preferably technically chlorine-free and acid-free. With the interlayer it is possible in particular to prevent the acid content and/or chlorine reacting with the surface of the substrate (e.g., glass) to form salts which are not readily washed off. The interlayer, moreover, preferably exhibits little particle release and/or releases particles which can be washed off on the substrate.

The flat substrates, more particularly the glass substrates, may have a thickness of less than 300 micrometers, preferably a thickness of less than 100 micrometers, more preferably a thickness of less than 50 micrometers.

The method for packing flat substrates further comprises, preferably, pressing the cover part onto the base part, in order to compress the foam element and/or fastening the cover part on the base part, as for example by means of one or more tapes encircling the packaging box, and/or enclosing the packaging box in an envelope in which a vacuum is generated or a protective gas is introduced, dry nitrogen for example. Strapping tapes may serve for or contribute to the pressing or compression of the foam element. An envelope containing a vacuum or protective gas may serve for or contribute to preventing the inflow of air and moisture and/or the deposition of salts on the substrates.

The invention, furthermore, also relates to packed flat substrates, more particularly glass substrates, produced or producible in accordance with the method described above.

The invention relates more particularly to packed flat substrates, as for example glass substrates, comprising a packaging box having a base part and a cover part, where the base part comprises a lower wall and preferably four lateral walls, and where the cover part comprises an upper wall and preferably four lateral walls, and a stack of flat substrates with interlayers therebetween, where the stack is placed directly or indirectly on the lower wall of the base part, and where the flat substrates preferably each have a spacing from the lateral walls of the base part, and where the interlayers preferably protrude laterally beyond the flat substrates and protrude into the lateral spacing.

The packed flat substrates may comprise an underlayer which is disposed between the lower wall of the base part and the stack of the flat substrates, where the underlayer preferably protrudes laterally beyond the stack and protrudes into the lateral spacing, more preferably bordering up to one, two or more or all of the lateral walls. The underlayer preferably comprises a hollow section plate and/or rubber, as for example ethylene-propylene-diene rubber. The underlayer preferably has a different color from the packaging box and/or from the interlayers, being more particularly black, or has a pattern, in order to enable or facilitate camera-assisted automated unpacking. There may, additionally be a further interlayer disposed between the underlayer and the stack.

The packed flat substrates may further comprise an overlay which is disposed between the upper wall of the cover part and the stack of the flat substrates, where the overlayer preferably protrudes laterally beyond the flat substrate and protrudes into the lateral spacing, more preferably bordering up to one, two or more or all of the lateral walls.

The overlayer preferably comprises a hollow section plate and/or rubber, as for example ethylene-propylene-diene rubber. Alternatively or additionally there may be a foam element disposed between the stack and the upper wall of the cover part, more particularly between the overlayer and the upper wall of the cover part.

The foam element preferably has at least one recess, more particularly two opposite recesses, more preferably with a desiccant pouch disposed therein. Alternatively or additionally to a drying pouch, the pack may also be filled with protective gas (e.g., dry nitrogen). There may be a further interlayer disposed between the stack and the overlayer.

The packed flat substrates may, furthermore, have individual, two or more or all of the features described in connection with the above-described method. In particular the interlayers may have the above-described properties and/or the flat substrates may have the above-described properties.

The invention, lastly, also relates to a method for unpacking packed flat substrates, more particularly glass substrates, from a packaging box.

The method for unpacking comprises removing a cover part of the packaging box for enabling access to a stack of flat substrates with interlayers therebetween, disposed on the base part of the packaging box, where the flat substrates preferably each have a spacing from lateral walls of the base part and where the interlayers preferably protrude laterally beyond the flat substrates and protrude into the lateral spacing.

The method for unpacking further comprises withdrawing a flat substrate from the stack, more particularly while the underlying interlayer or the underlying interlayers is or are being held down at the regions protruding into the lateral spacing.

The method for unpacking preferably further comprises withdrawing, from the stack, the interlayer situated under the flat substrate that has been withdrawn.

The method preferably comprises repeating the withdrawal of flat substrates and interlayers until all the flat substrates and/or interlayers have been withdrawn from the stack.

In the method for unpacking packed flat substrates, the withdrawing of the flat substrates and preferably of the interlayers may be automated.

In particular the unpacking may be monitored by a camera for automated recognition of when the last flat substrate or the last interlayer is withdrawn from the stack.

Preferably there is an underlayer disposed between the lower wall of the base part and the stack of flat substrates, where the underlayer preferably has a different color or patterning from the packaging box and/or from the interlayers, being more particularly black, in order to enable or to facilitate automated recognition.

Furthermore, the method for unpacking may have individual, two or more or all of the features described in connection with the above-described packed flat substrates and/or with the above-described method for packaging flat substrates.

In particular the interlayers may have the above-described properties and/or the flat substrates may have the above-described properties.

BRIEF DESCRIPTION OF THE DRAWINGS

The invention is elucidated in more detail below with a number of figures, in which.

DETAILED DESCRIPTION

Figure 3:
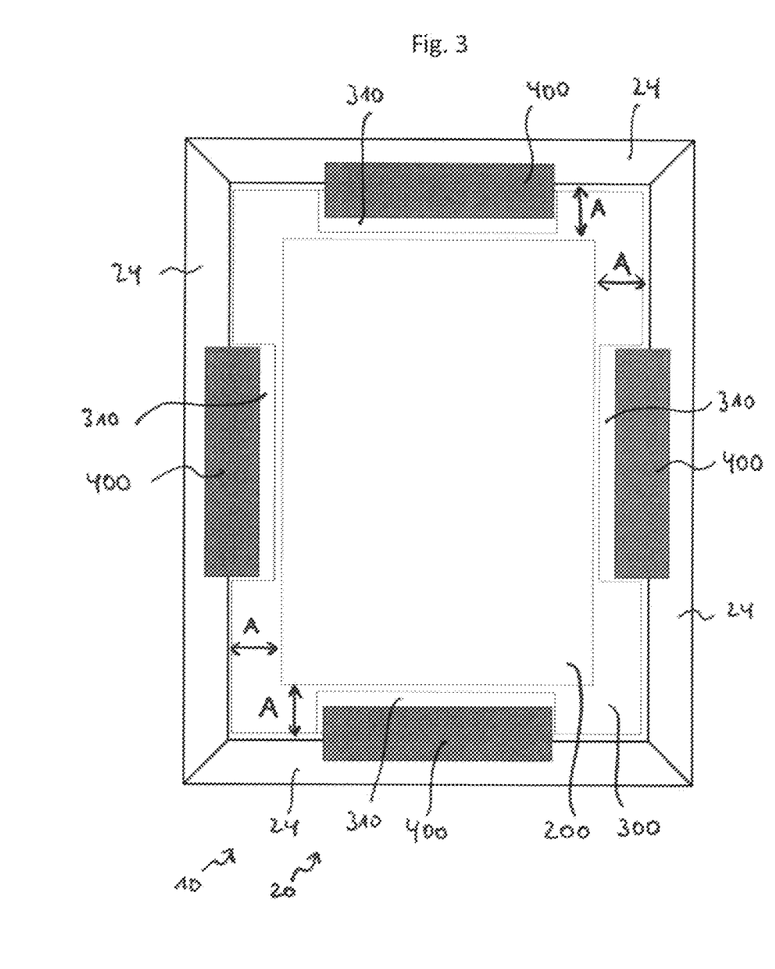
FIG. 3 shows a plan view of a base part of the packaging box with inserted underlayer, inserted centering aids, an emplaced interlayer, and an emplaced flat substrate.
Figure 4:
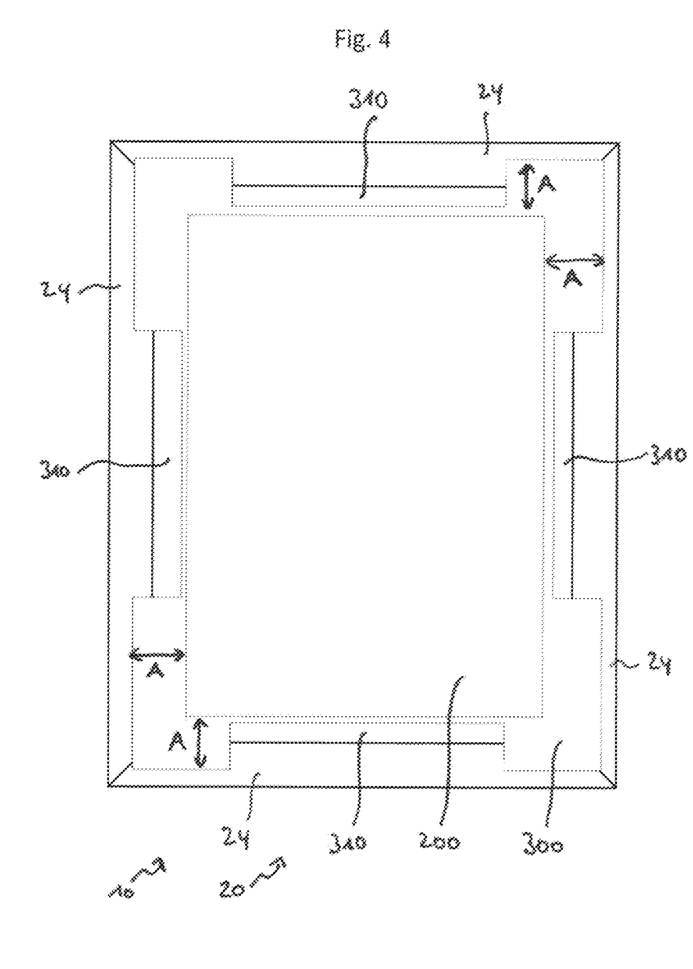
FIG. 4 shows a plan view of a base part of the packaging box with a stack of flat substrates with interlayers therebetween.
Figure 5:
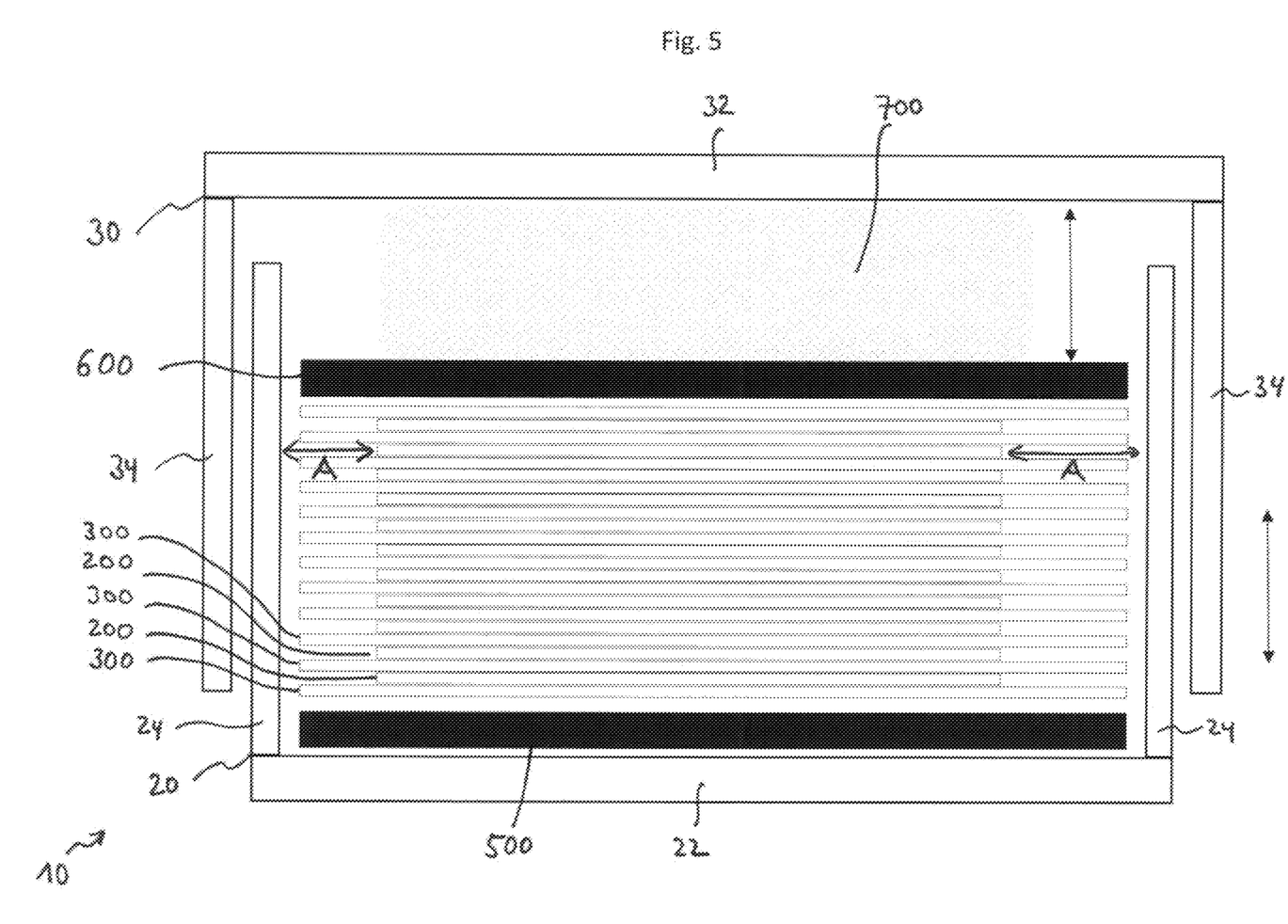
FIG. 5 shows a lateral sectional representation of a packaging box with a base part, a top part and, packed therein, a stack of flat substrates with interlayers therebetween.

FIGS. 1-5 show different, successive stages of an illustrative method for packing flat substrates 200. FIG. 5, moreover, serves as a representation of packed flat substrates in accordance with the illustrative method.

With reference to FIG. 5, the packaging box 10 comprises a base part 20 and also a cover part 30 which can be fitted onto the base part. The base part 20 has a lower wall 22 and lateral walls 24, and the lateral walls 24 may be foldable. In a similar way, the cover part 30 has an upper wall 32 and also lateral walls 34, which likewise may be foldable. Instead of foldable side mountings of the packaging box, the boxes may also have a fixed side part which after having been folded, for example, can no longer be folded out. The packaging box 10, the base part 20 and/or the cover part 30 may comprise hollow section elements or consist thereof and/or may contain or consist of polypropylene (PP), in particular in order to ensure secure jacketing of the substrates being packed.

Figure 1:
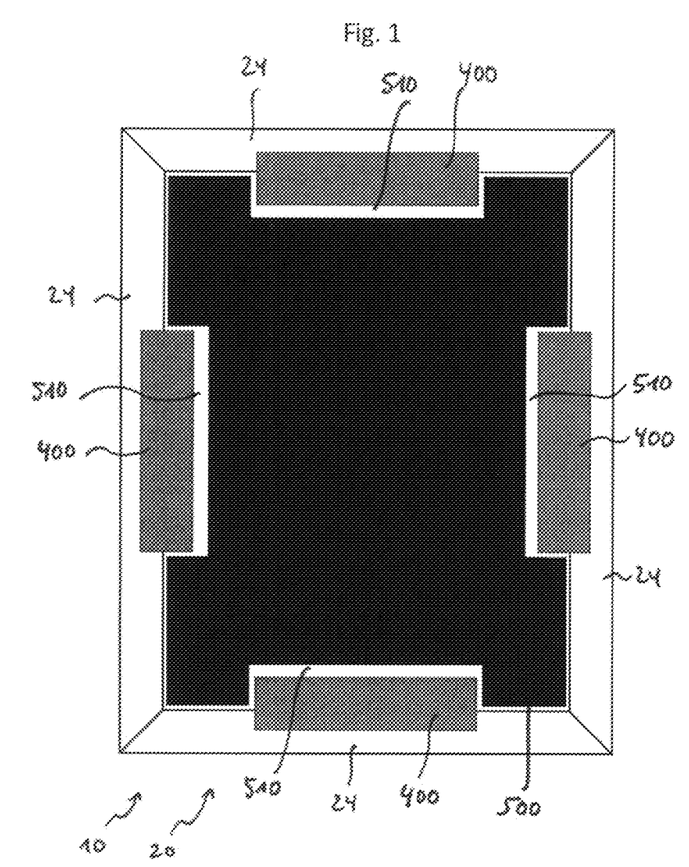
FIG. 1 shows a plan view of a base part of the packaging box with inserted underlayer and inserted centering aids.

With reference to FIG. 1, for the method for packing, first the base part 20 is provided and an underlayer 500 is placed on the lower wall 22 of the base part 20. In addition, centering aids 400 are inserted into the base part 20 onto the lower wall 200 and bordering the lateral walls 24. For this, the underlayer 500 has recesses 510 on the marginal side for the centering aids 400. The underlayer 500 is a stiff plate and may comprise or consist of polypropylene (PP), for example.

Figure 2:
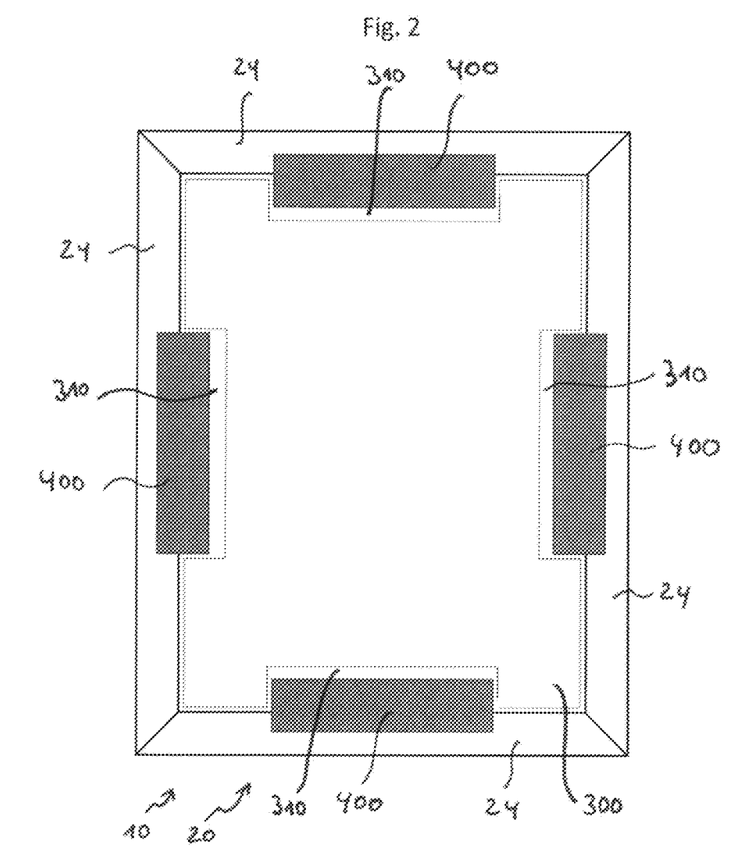
FIG. 2 shows a plan view of a base part of the packaging box with inserted underlayer, inserted centering aids, and an emplaced interlayer.

With reference to FIG. 2, in a subsequent step, a first interlayer 300, which in particular is embodied as an interlayer paper, is placed onto the underlayer 500 and hence indirectly onto the lower wall 22 of the base part. The interlayer 300 in turn has recesses 310 for the centering aids.

Referring to FIG. 3, in a subsequent step, a flat substrate 200, more particularly a glass sheet, is placed onto the interlayer 300 and hence indirectly onto the lower wall 22 of the base part. The flat substrate 200 is emplaced in such a way that there is a lateral spacing A remaining between the flat substrate 200 and each of the side walls 24. Aiding for this purpose are, in particular, the centering aids 400 (guiding blocks). The guiding blocks at the sides may also contribute to the stabilization.

With reference to FIG. 4, in a following step, in alternation, further interlayers 300 and flat substrates 200 are placed on, to form a stack 100 with flat substrates 200 and interlayers 300 therebetween. The interlayers 300 each have an excess size in relation to the flat substrates, and so protrude beyond the flat substrate 200 and into the lateral spacing A.

In other words, the interlayer paper is larger than glass sheets and there is at least one recess in the interlayer material, with the glass sheet not extending into the region of this recess, meaning that the interlayer paper in the region of the recess without glass sheets is accessible from the side.

Before the packaging box 10 is closed by the fitting of the cover part 30, an overlayer 600, identical or similar to the underlayer 500, can be placed onto the stack 100, and may be embodied as a stiff plate. The underlayer 500 and/or the overlayer 600 contribute to the stabilization of the glass-paper stack. The underlayer 500, the interlayers 300 and/or the overlayer 600 have the lateral cut-outs for the centering aids in each case at the same position, so that the centering aids can remain in the base part during the packing method. More particularly the recesses are each outwardly open laterally in the center, in such a way that the underlayer, the interlayers and/or the overlayer project further at the corners ("puzzle shape"). The centering aids (guiding blocks) are preferably withdrawn before the cover part 30 is fitted.

With reference to FIG. 5, before the fitting of the cover part 30, a foam element 700 as well is placed onto the overlayer 600, with the foam element 700 protruding beyond the upper margin of the lateral walls 24 of the base part 20, so that on compression it exerts a pressure on the stack 100. The foam element 700 therefore serves for compression and/or fastening of the stack 100. Lastly, the packaging box 10 may be provided additionally with strapping tapes and/or with a vacuum envelope.

Packed flat substrates, more particularly glass substrates, produced or producible in this way may be unpacked automatically, in particular at a different location. Illustratively, it is possible for this purpose first to remove the vacuum envelope and/or the strapping tapes, and to take off the cover part 30, the foam element 700 and/or the overlayer 600, in order to make the stack 100 accessible for automated unpacking.

Automated unpacking of the stack 100 may entail the lifting alternately of interlayers 300 and flat substrates 200 from the stack, where lifting from the stack 100 may be accomplished by suction—for example, a substrate 200 may be suctioned by means of a two-dimensional sucker.

In order to enable or facilitate automated lifting, the substrates 200 are preferably centered on the stack. In addition, the substrates 200 may be centered, for example, at a particular spacing relative to the interlayers 300, such as with a paper edge/glass edge spacing of 2 to 2.5 millimeters all round, for example. The interlayers 300 may correspond substantially to the dimensions of the base part (apart from recesses).

The surfaces of the interlayers 300 preferably have different embodiments on the top and bottom sides, where a smoother upper side and rougher lower side may be provided. By means of an asymmetric interlayer material of this kind, it is possible advantageously to exploit coefficients of friction or tribological effects. In particular, as a result of a rougher lower side, an interlayer 300 can be withdrawn more easily, since when the interlayer 300 is withdrawn, the underlying substrate (more particularly UTG) remains lying as a result. The flat substrates 200 typically adhere more strongly to a smooth surface. An advantage of effective adhesion of the substrates to a smoother upper side of the interlayers 300 is that the substrates do not slip on the interlayer or on the stack 100. It is noted that the adhesion of glass to paper when the glass is being withdrawn can be unproblematic, since a hold-down device for projecting paper can be utilized in order to prevent slipping.

During the lifting of the substrate 200, the underlying interlayer 300 is preferably held down. Holding down takes place preferably at the corners of the interlayer 300 or in the corners between adjacent lateral walls 24 of the base part of the packaging box. As a result of the holding down, the surface attraction between the substrate and the underlying interlayer is counteracted. The paper thickness is preferably tailored to automated unpacking and in particular is neither too low, to prevent handling problems, nor too high, to prevent problems with the glass surface.

While the substrates 200 and interlayers 300 are being withdrawn successively from the stack 100, the process may be monitored with a camera, with recognition of when all substrates 200 and/or interlayers 300 have been withdrawn from the stack 100. For this purpose, the packaging box may have a two-color design, in particular with an underlayer which is different in color, black for example, or comprises a pattern.

What is claimed is:

1. A package of flat glass substrates, comprising:
   a packaging box having a base part and a cover part, wherein the base part comprises a lower wall and a plurality of lateral walls, and wherein the cover part comprises an upper wall and a corresponding plurality of lateral walls;
   a stack of flat glass substrates with interlayers therebetween, wherein the stack is directly or indirectly on the lower wall; and
   a lateral space between the stack and the plurality of lateral walls of the base part, wherein the interlayers protrude beyond the flat substrates and into the lateral space,
   wherein the interlayers have a lower surface with a higher surface roughness than an upper surface.

2. The package of flat glass substrates of claim 1, further comprising an underlayer between the lower wall and the stack, wherein the underlayer protrudes laterally beyond the stack and into the lateral space.

3. The package of flat glass substrates of claim 2, wherein the underlayer has an automation camera-detectable feature selected from a group consisting of: a color that differs from the packaging box, a color that differs from the interlayer, a pattern that differs from the packaging box, a pattern that differs from the interlayer, and any combinations thereof.

4. The package of flat glass substrates of claim 1, further comprising an overlayer between the upper wall of the cover part and the stack, wherein the overlayer protrudes laterally beyond the stack and into the lateral space.

5. The package of flat glass substrates of claim 4, further comprising a foam element between the overlayer and the upper wall of the cover part.

6. The package of flat glass substrates of claim 1, wherein the interlayer has a feature selected from a group consisting of: a pH between 5 and 9, a pH between 6 and 8, a pH between 7 and 8, an interlayer thickness that is larger than a thickness of the flat substrate, an interlayer thickness that is 1.25 times larger than a thickness of the flat substrate, and an interlayer thickness that is 1.5 times larger than a thickness of the flat substrate.

7. The package of flat glass substrates of claim 1, wherein the interlayers have a recess at a marginal side in the lateral space, the recess being configured so that the flat substrates do not extend into the recess.

8. A package of flat glass substrates, comprising:
   a packaging box having a base part and a cover part, wherein the base part comprises a lower wall and a plurality of lateral walls, and wherein the cover part comprises an upper wall and a corresponding plurality of lateral walls;
   a stack of flat glass substrates with interlayers therebetween, wherein the stack is directly or indirectly on the lower wall; and
   a lateral space between the stack and the plurality of lateral walls of the base part, wherein the interlayers protrude beyond the flat substrates and into the lateral space, wherein the interlayers have an interlayer thickness that is larger than a thickness of the flat glass substrates.

9. The package of flat glass substrates of claim 8, further comprising an underlayer between the lower wall and the stack, wherein the underlayer protrudes laterally beyond the stack and into the lateral space.

10. The package of flat glass substrates of claim 9, wherein the underlayer has an automation camera-detectable feature selected from a group consisting of: a color that differs from the packaging box, a color that differs from the interlayer, a pattern that differs from the packaging box, a pattern that differs from the interlayer, and any combinations thereof.

11. The package of flat glass substrates of claim 8, further comprising an overlayer between the upper wall of the cover part and the stack, wherein the overlayer protrudes laterally beyond the stack and into the lateral space.

12. The package of flat glass substrates of claim 8, wherein the interlayer has a feature selected from a group consisting of: opposite surfaces having different surface roughnesses, a lower surface with higher surface roughness than an upper surface, a pH between 5 and 9, a pH between 6 and 8, and a pH between 7 and 8.

13. The package of flat glass substrates of claim 8, wherein the interlayer thickness is 1.25 times larger than the thickness of the flat substrate.

14. The package of flat glass substrates of claim 8, wherein the interlayer thickness is 1.5 times larger than the thickness of the flat substrate.

15. The package of flat glass substrates of claim 8, wherein the interlayers have a recess at a marginal side in the lateral space, the recess being configured so that the flat substrates do not extend into the recess.

16. A package of flat glass substrates, comprising:
a packaging box having a base part and a cover part, wherein the base part comprises a lower wall and a plurality of lateral walls, and wherein the cover part comprises an upper wall and a corresponding plurality of lateral walls;
a stack of flat glass substrates with interlayers therebetween, wherein the stack is directly or indirectly on the lower wall;
a lateral space between the stack and the plurality of lateral walls of the base part,
an underlayer between the lower wall and the stack, wherein the interlayer and the underlayer protrude laterally beyond the stack and into the lateral space, wherein the underlayer has an automation camera-detectable color that differs from a color of the packaging box and/or a color of the interlayer.

17. The package of flat glass substrates of claim 16, wherein the underlayer has an automation camera-detectable feature selected from a group consisting of: a color that differs from the packaging box, a color that differs from the interlayer, a pattern that differs from the packaging box, a pattern that differs from the interlayer, and any combinations thereof.

18. The package of flat glass substrates of claim 16, further comprising an overlayer between the upper wall of the cover part and the stack, wherein the overlayer protrudes laterally beyond the stack and into the lateral space.

19. The package of flat glass substrates of claim 16, wherein the interlayer has a feature selected from a group consisting of: opposite surfaces having different surface roughnesses, a lower surface with higher surface roughness that an upper surface, a pH between 5 and 9, a pH between 6 and 8, a pH between 7 and 8, an interlayer thickness that is larger than a thickness of the flat substrate, an interlayer thickness that is 1.25 times larger than a thickness of the flat substrate, and an interlayer thickness that is 1.5 times larger than a thickness of the flat substrate.

20. The package of flat glass substrates of claim 16, wherein the interlayers have a recess at a marginal side in the lateral space, the recess being configured so that the flat substrates do not extend into the recess.

* * * * *